(12) United States Patent
McKellar et al.

(10) Patent No.: US 7,444,585 B2
(45) Date of Patent: *Oct. 28, 2008

(54) DELTA HANDLING IN SERVER PAGES

(75) Inventors: Brian McKellar, Heidelberg (DE); Bjorn Goerke, Muhlhausen (DE)

(73) Assignee: SAP Aktiengesellschaft, Walldorf (DE)

( * ) Notice: Subject to any disclaimer, the term of this patent is extended or adjusted under 35 U.S.C. 154(b) by 752 days.

This patent is subject to a terminal disclaimer.

(21) Appl. No.: 10/159,817

(22) Filed: May 31, 2002

(65) Prior Publication Data

US 2003/0225826 A1 Dec. 4, 2003

(51) Int. Cl.
*G06F 15/00* (2006.01)

(52) U.S. Cl. .............. 715/234; 715/229; 715/255; 707/10; 709/203

(58) Field of Classification Search ............ 715/513, 715/234–240; 709/203, 219, 201, 312; 707/200, 707/10, 523; 370/254
See application file for complete search history.

(56) References Cited

U.S. PATENT DOCUMENTS

| | | | |
|---|---|---|---|
| 5,701,451 A | 12/1997 | Rogers et al. | |
| 5,706,507 A | 1/1998 | Schloss | |
| 5,835,712 A | 11/1998 | DuFresne | |
| 5,946,697 A | 8/1999 | Shen | 707/104 |
| 5,963,952 A | 10/1999 | Smith | |
| 5,983,227 A * | 11/1999 | Nazem et al. | 707/10 |
| 6,003,087 A | 12/1999 | Housel et al. | |
| 6,006,260 A * | 12/1999 | Barrick et al. | 709/224 |
| 6,031,989 A | 2/2000 | Cordell | |
| 6,073,173 A | 6/2000 | Bittinger et al. | |
| 6,112,242 A | 8/2000 | Jois et al. | |
| 6,122,657 A | 9/2000 | Hoffman et al. | |
| 6,128,655 A | 10/2000 | Fields et al. | |
| 6,161,107 A | 12/2000 | Stern | |
| 6,167,395 A | 12/2000 | Beck et al. | |
| 6,209,029 B1 | 3/2001 | Epstein et al. | |
| 6,239,797 B1 | 5/2001 | Hills et al. | 345/340 |
| 6,249,291 B1 | 6/2001 | Popp et al. | |
| 6,253,228 B1 | 6/2001 | Ferris et al. | |
| 6,266,681 B1 | 7/2001 | Guthrie | |
| 6,311,187 B1 | 10/2001 | Jeyaraman | |
| 6,377,957 B1 * | 4/2002 | Jeyaraman | 707/200 |
| 6,389,592 B1 | 5/2002 | Ayres et al. | |

(Continued)

FOREIGN PATENT DOCUMENTS

EP 1016987 A2 5/2000

OTHER PUBLICATIONS

Williams, S.; "HTTP: Delta-Encoding Notes"; *Internet*; Jan. 17, 1997; 7pp.

(Continued)

*Primary Examiner*—Doug Hutton
*Assistant Examiner*—Quoc A Tran
(74) *Attorney, Agent, or Firm*—Fish & Richardson P.C.

(57) ABSTRACT

Methods, systems and apparatus, including computer program products, for delta handling. A server has a page document with multiple page components. The server allocates a component buffer to each page component and writes a corresponding browser component into each allocated component buffer. In one aspect, the server identifies at least one browser delta in at least one identified component buffer and sends the browser delta to a client.

37 Claims, 9 Drawing Sheets

U.S. PATENT DOCUMENTS

| | | | |
|---|---|---|---|
| 6,397,387 | B1 | 5/2002 | Rosin et al. |
| 6,429,880 | B2 | 8/2002 | Marcos et al. |
| 6,480,865 | B1 | 11/2002 | Lee et al. |
| 6,605,120 | B1* | 8/2003 | Fields et al. ............... 715/513 |
| 6,622,168 | B1 | 9/2003 | Datta |
| 6,694,336 | B1 | 2/2004 | Multer et al. |
| 6,766,351 | B1 | 7/2004 | Datla |
| 6,807,606 | B2 | 10/2004 | Copeland et al. |
| 7,007,237 | B1 | 2/2006 | Sharpe |
| 7,051,084 | B1* | 5/2006 | Hayton et al. ............... 709/219 |
| 7,139,976 | B2 | 11/2006 | Kausik et al. |
| 2002/0004813 | A1* | 1/2002 | Agrawal et al. ............. 709/201 |
| 2002/0046240 | A1 | 4/2002 | Graham et al. |
| 2002/0091736 | A1* | 7/2002 | Wall ........................... 707/513 |
| 2002/0107892 | A1* | 8/2002 | Chittu et al. ................ 715/514 |
| 2002/0147849 | A1 | 10/2002 | Wong |
| 2002/0156812 | A1 | 10/2002 | Krasnoiarov et al. |
| 2002/0156815 | A1 | 10/2002 | Davia |
| 2002/0188696 | A1 | 12/2002 | Ullmann et al. |
| 2003/0018612 | A1 | 1/2003 | Melbin |
| 2003/0125966 | A1 | 7/2003 | Viswanath et al. |
| 2003/0149749 | A1* | 8/2003 | Carlucci et al. ............. 709/219 |
| 2003/0188016 | A1 | 10/2003 | Agarwalla et al. |
| 2003/0212987 | A1 | 11/2003 | Demuth et al. |
| 2003/0217331 | A1 | 11/2003 | McKellar et al. |
| 2003/0226106 | A1 | 12/2003 | McKellar et al. |
| 2004/0205558 | A1 | 10/2004 | Holloway et al. |
| 2005/0099963 | A1* | 5/2005 | Multer et al. ............... 370/254 |

OTHER PUBLICATIONS

Housel, C. et al.; "WebExpress: A System For Optimizing Web Browsing In A Wireless Environment"; *Proceedings Of The Annual International Conference On Mobile Computing and Networking*; Nov. 11, 1996; pp. 108-116.

Douglis, Fred et al.; HPP: HTML Macro-Preprocessing To Support Dynamic Document Caching; *Proceedings of The Usenix Symposium On Internet Technologies and Systems*; Dec. 8, 1997; pp. 83-94.

Edwards, Peter; "DIY Intranets With CFML/XML/HTML/CGI/ASP/JSP"; *Vine*; No. 119; 2000; pp. 53-60.

Chang, George et al.; "A Graphical Environemnt for Change Detection in Structured Documents"; *IEEE Computer Soc.*; Aug. 13, 1997; pp. 536-541.

Floyd, Rick et al.; "Mobile Web Access Using eNetwork Web Express"; *IEEE Personal Communications*; vol. 5, No. 5; Oct. 1, 1998; pp. 47-52.

Seshadri, Govind, "Advanced Form Processing Using JSP", JavaWorld, Mar. 2000, pp. 1-20, (downloaded from: http://www.javaworld.com/javaworld/jw-03-2000/jw-0331-ssj-fors_p.html).

Mahmoud, Qusay H., "Web Application Development with JSP and XML, Part I: Fast Track JSP", TheServerSide.COM, May 2001, pp. 1-10 (downloaded from: http://www.theserverside.com/articles/article.tss?I=JSP-XML).

Mahmoud, Qusay H., "Web Application Development with JSP and XML. Part III: Developing Custom JSP Tags", TheServerSide.COM, Aug. 2001, pp. 1-22 (downloaded from: http://www.theserverside.com/articles/article.tss?I=JSPXML3).

McPherson, Scott, "Java server Pages: A developer's Perspective", developers.sun.com, Aug. 2001, pp. 1-5 (downloaded from: http://www.sun.com/developer/technicalArticles/Programming/jsp/index.html).

Kristmundsson, Thor, et al., "Strut Your Stuff With JSP Tags: Use and Extend the Open Source Struts JSP Tag Library", developers.sun.com, Aug. 2001, pp. 1-7 (downloaded from: http://www.sun.com/developer/technicalArticles/javaserverpages/strust_jsp/).

Weissinger, A. Keyton, ASP in a Nutshell, 2nd Edition, O'Reilly & Associates, Sebastopol, CA Jul. 2000, pp. 3-22.

Hall, Marty, et al., Core Web Programming, 2nd Edition, Sun Microsystems Press (Prentice Hall), Palo Alto, CA, © 2001, pp. 792-793, 965-968, 971-977 and 1015-1026.

Hougland, Damon, et al., Core JSP, Prentice Hall PTR, Upper Saddle River, NJ, © 2001, pp. 1-11, 54-56, 60-61, 78-87 and 131-143.

Microsoft Dictionary, 5th Edition, Microsoft Press, Redmond, WA, © 2002, pp. 293-294.

Wills, Craig E., et al., "N for the Price of 1: Bundling Web Objects for More Efficient Content Delivery", WWW 10, May 1-5, 2001, Hong Kong, pp. 257-264.

Housel, Barron C., et al., "WEBExpress: A Client/Intercept Based System for Optimizing Web Browsing in a Wireless Environment," Mobile Networks and Applications, vol. 3, Baltzer Science Publishers BV, © 1998, pp. 419-431.

Feinstein, Wei Pan, et al., "A Study of Technologies for Client/Server Applications," Proceedings of the 38th Annual ACM Southeast Regional Conference, Apr. 2000, Hong Kong, pp. 184-193.

Williams, "HTTP: Delta-Encoding Notes"; Published Jan. 17, 1997; Computer Science Department, Virginia Polytechnic and State University Blacksburg, 10 pages URL: http://ei.cs.vt.edu/~williams/DIFF/prelim.html.

Bai, Jing et al., "Design and Development of an Interactive Medical Teleconsultation System Over the World Wide Web", *IEEE Transactions on Information Technology in Biomedicine*, vol. 2, No. 2 (Jun. 1998), pp. 74-79.

Dickens, Phillip M. et al., "An Evaluation of Java's I/O Capabilities for High-Performance Computing", *Proceedings of the ACM 2000 Conference on Java Grande*, San Francisco, CA (2000), pp. 26-35.

Kemper, Alfons et al., "Hyperqueries: Dynamic Distributed Query Processing on the Internet", *Proceedings of the 27th VLDB Conference*, Roma, Italy, (Sep. 11-14, 2001), pp. 1-10.

Mogul, Jeffrey C., "Squeezing More Bits Out of HTTP Caches", *IEEE Network*, vol. 14, Iss. 3 (May/Jun. 2000), pp. 6-14.

\* cited by examiner

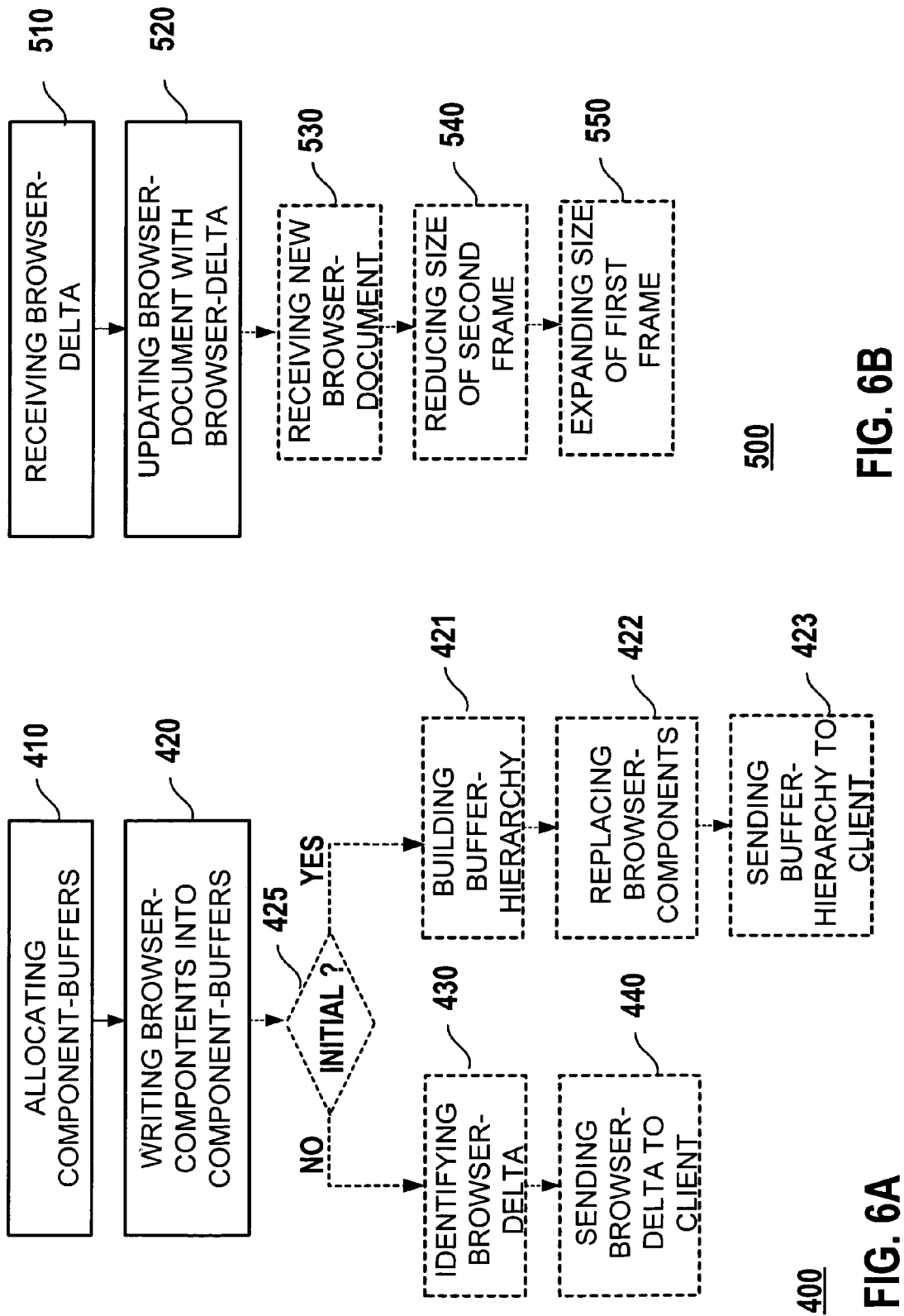

DELTA HANDLING IN SERVER PAGES

BACKGROUND OF THE INVENTION

The present invention relates to client-server communication.

A JavaServer Pages™ ("JSP") page is a markup language page, typically an HTML (Hypertext Markup Language) web page, that contains additional bits of code that execute application logic to generate dynamic content. The application logic may involve various kinds of objects that can be accessed from a JSP page. For example, a JSP page may contain HTML code that displays static text and graphics, as well as a method call to an object that accesses a database; when the page is displayed in a user's browser, it will contain both the static HTML content and dynamic information retrieved from the database. Thus, a JSP page looks like an HTML (or XML) page—it contains text encapsulated by tags, which are defined between angle brackets ("<>"). While HTML tags are processed by a user's web browser to display the page, JSP tags are used by the web server to generate dynamic content.

A JSP page is an example of a dynamic web page, which in this specification will be referred to simply as a server page or a page. There are other technologies, similar to JSP, that can be used to create HTML or XML pages dynamically on a server. These include, by way of example, SAP Business Server Pages (BSP), Microsoft Active Server Pages (ASP), and AOLserver Dynamic Pages (ADP) technologies. In these technologies, functionality is embedded in structure in the form of special tags in a markup language document, and content and structure (presentation) are merged when the page is generated by a server. In alternative technologies for creating server pages, e.g., traditional servlet and CGI (Common Gateway Interface) script technologies, structure and presentation are embedded within functionality to create dynamic web pages.

In this specification, it is sometimes necessary to distinguish the page as it exists on the server from the page as it exists on the client. The term "page document" will be used to refer to the page that is processed by a server—e.g., a .jsp page. The term "browser document" will be used to refer to the page that is received and processed by a client and generally displayed to a human user—e.g., an HTML page generated by processing of a .jsp page by a JSP engine.

A server page can include information for a graphical user interface ("GUI") to generate a browser document. The server can transmit the browser document to a client through a network. At the client, the browser document is rendered for display. This is typically done by a web browser, such as the Microsoft® Internet Explorer. When a user interacts with the client through the GUI to refresh the page, the entire process is repeated: the whole page, including layout information and data, is generated on the server and the resulting browser document is transmitted from the server to the client through the network. If the network has insufficient bandwidth, transmitting the whole page can cause undesired effects: until the refreshed page is finally presented, there can be a long waiting time or screen flicker.

Some browsers, such as the Microsoft Internet Explorer 6.0, include a feature for flicker-free rendering. When the client receives a modified page, the browser identifies modified components of the page and only replaces these components instead of the whole page, for example, by dynamic HTML injection into the page's Document Object Model (DOM). Dynamic HTML injection can reduce screen flicker for the user, but, because the whole page is transmitted through the network, insufficient network bandwidth can still cause undesirable waiting times.

SUMMARY OF THE INVENTION

The present invention provides methods and apparatus, including computer program products, for delta-driven refreshing of server pages.

In general, in one aspect, this invention provides methods and apparatus, including computer program products, for delta handling on a server. The server allocates a component buffer to each page component of a page document with multiple page components. A corresponding browser component is written into each allocated component buffer.

Advantageous implementations of the invention can include one or more of the following features. A change can be detected in at least one identified component buffer. Information indicating the change can be transmitted to a client. Detecting a change can include identifying at least one browser delta in the at least one identified component buffer. Transmitting information indicating the change can include sending the at least one browser delta to the client. The at least one browser delta can be represented in a browser-compliant language selected from the group of HTML, XML, XHTML, WML, JavaScript and Visual Basic Script. A page buffer can be allocated to the page document. A buffer hierarchy can be built, where the page buffer is the root node of the buffer hierarchy and is a parent node of at least one component buffer. Each component buffer can be a parent node of further component buffers. The browser component of a child node in a corresponding parent node of the buffer hierarchy can be replaced with a representation of the browser component. The page buffer and each component buffer of the buffer hierarchy can be sent to a client. The page document can be a JSP, BSP, ADP, or ASP page. Each page component can be represented by a tag within the page document. Each component buffer can be stored in a memory stack.

In general, in another aspect, this invention provides methods and apparatus, including computer program products, for delta handling on a client having a browser document. The browser document corresponds to a page document stored on a server and includes multiple browser components. Each browser component refers to a corresponding page component of the page document. The client receives change information that refers to a specific browser component and specifies a change to the specific browser component. The browser document is updated in accordance with the change information.

Advantageous implementations of the invention can include one or more of the following features. Receiving change information can include receiving a browser delta from the server. The browser delta refers to a specific browser component and is identified by the server by a component buffer being allocated to the corresponding page component. The browser document can be updated with the browser delta. Updating the browser document can include injecting the browser delta into a document object model of the browser document. The browser delta can be received by a first frame and the browser document can be updated with the browser delta in a second frame. The first frame can be invisible. When a new browser document is received in the first frame, the size of the second frame can be reduced and the size of the first frame can be expanded. The second frame can be invisible.

The invention can be implemented to realize one or more of the following advantages. The required bandwidth for network communication can be lower when compared to prior art systems where the whole browser document is exchanged between the server and client. When a minor portion of the browser document is modified, the browser delta transmission can require significant less bandwidth than the whole browser document transmission. The browser delta can be determined by comparing two versions of the browser document. The differences between the two versions can be detected at the level of browser components. The granularity of the browser delta can be defined by the granularity of the corresponding browser component. The server can send the browser delta in an output stream to a client. The client can receive the browser delta in an invisible first frame and update the corresponding browser document in a second frame. The client can swap the roles of the first and the second frames. Consequently, a user who interacts with the client can experiences a visually pleasing effect, because the update of the browser document with the browser delta results in a flicker-free change of the graphical user interface.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 6A-6B are flow charts showing methods for delta handling in accordance with the invention.

Like reference symbols in the various drawings indicate like elements.

DETAILED DESCRIPTION

Definition of Terms

Client: A computer having a client relationship with a computer acting as a server.

Server: A computer having a server relationship with a computer acting as client. A client and server are generally remote from each other and typically interact through a communication network, e.g., a local area network ("LAN") or a wide area network ("WAN"), e.g., the Internet. The relationship of client and server arises by virtue of computer programs running on the respective computers and having a client-server relationship to each other.

Application data: Data relating to a computer program application (e.g., customer number, address, phone number, and so forth).

Layout data: Data defining placement of content of a graphical user interface.

Browser delta: A data structure that represents what is different between two different states of a browser document (e.g., before and after a user interaction).

Tag: A representation of a page component in a page. For example, in JSP pages, tags use XML notation and represent a Java class.

Output stream: Data structure used to collect the output of page components.

Document object model: The document object model (DOM) is a platform- and language-neutral interface that allows programs and scripts dynamically to access and update the content, structure and style of documents, and that provides a mechanism to access and manipulate parsed HTML and XML content.

A System for Delta-Driven Refreshing of Pages

A system in accordance with the invention defines components of a server page and allocates memory to each component. The system writes contents of a component to the respective allocated memory and, upon detecting a change in the written component, identifies the allocated memory and transmits its contents to a device, such as a client computer, that is displaying the contents. Changes are also referred to as deltas.

EXAMPLES

Figure 1:
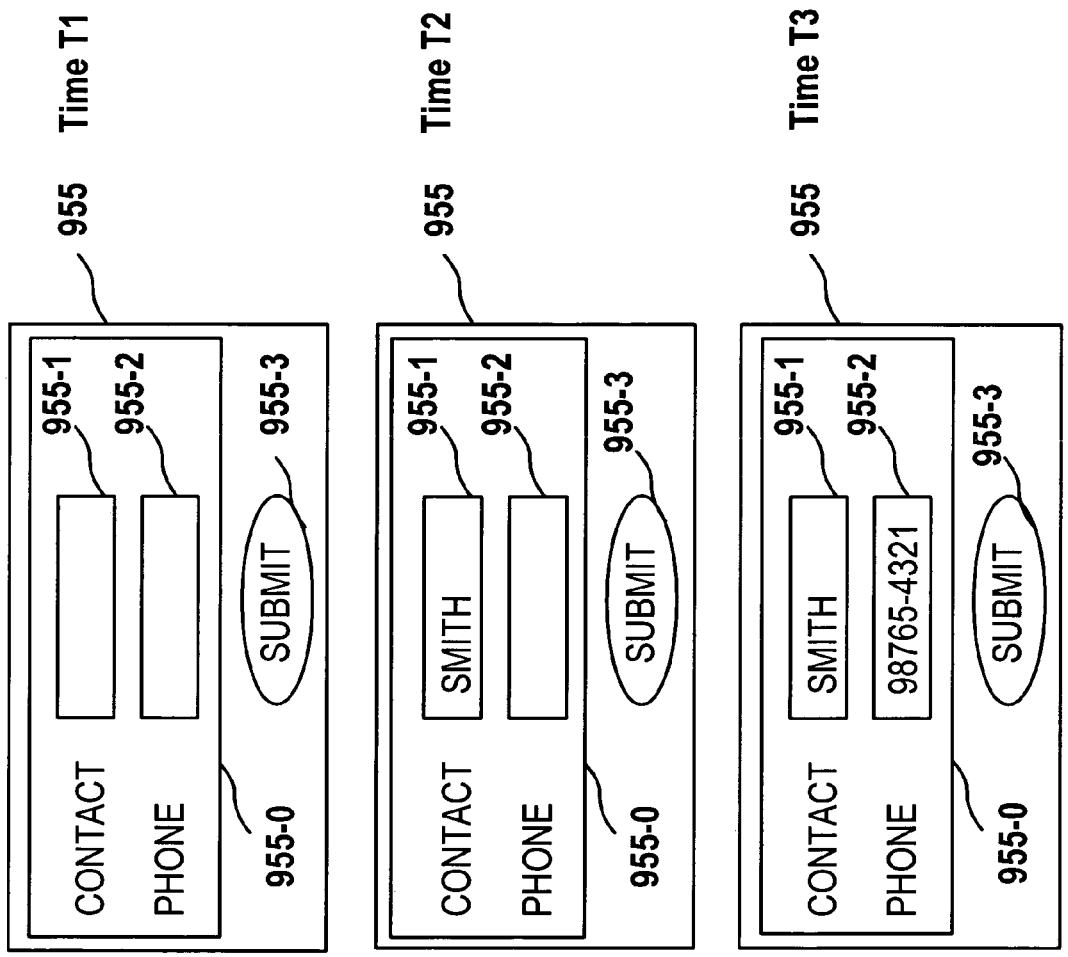
FIG. 1 is a schematic diagram illustrating an implementation of a graphical user interface in accordance with the present invention.

FIG. 1 illustrates an example implementation of a user's interaction with a graphical user interface 955 at three consecutive times T1, T2, and T3. For convenience, this example is used throughout this specification. However, any other graphical user interface can be implemented in accordance with the present invention. A client computer can render the GUI 955 for display to a user on an output device, e.g., on a computer display, and the user can interact with the GUI 955 by using an input device, e.g., a keyboard or a pointing device.

The GUI 955 illustrated in FIG. 1 is a form that can be used to allow a user to retrieve a phone number of a contact person from an application database. The user is prompted with the following form components: a frame component 955-0, a contact component 955-1, a phone component 955-2, and a submit component 955-3. The frame component 955-0 visualizes a contextual relationship between the contact component 955-1 and the phone component 955-2. The contact component 955-1 is an input field where the user can enter the name of the contact person. The phone component 955-2 is an output field where the contact person's phone number can be presented to the user. Implemented as a button, the submit component 955-3 can be pressed by the user to send a request to the application to retrieve the contact person's phone number.

At time T1, the user is prompted with the form 955 having empty contact (955-1) and phone (955-2) components. Next, the user enters the name, e.g., SMITH, of the contact person into contact component 955-1, and, at a later time T2, uses submit component 955-3 to send a request to retrieve the contact person's phone number. At time T3, after the application retrieves the phone number of the contact person, e.g., 98765-4321, the phone number is displayed for the user in phone component 955-2.

Figure 2:
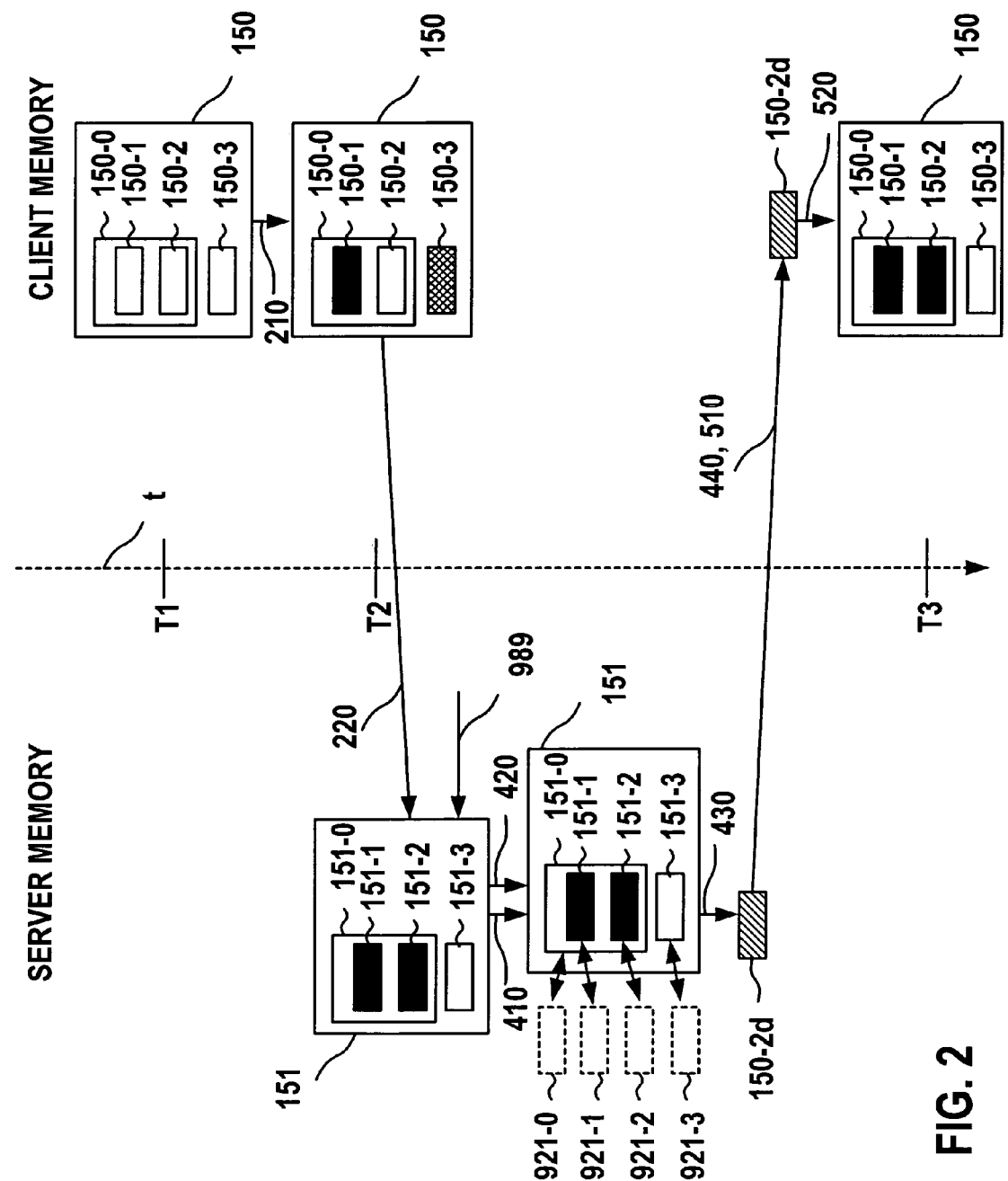
FIG. 2 is a schematic diagram illustrating interaction of a server and a client according to one implementation of the present invention.

FIG. 2 illustrates a client-server interaction. Represented by a vertical dashed arrow in FIG. 2, a time scale t indicates chronological order of events; time scale t, however, is not drawn to any scale. Times T1, T2, and T3 are reference points in the flow of events, and correspond to times shown in FIG. 1. Solid arrows represent specific events or signals. In FIG. 2, as divided by the time scale t, the left side represents objects that are stored in a memory of the server ("server memory"), and the right side represents objects that are stored in a memory of the client ("client memory"). In the example implementation, the server computer accesses application data such as contact person or phone number, and the client computer presents the application data to the user in GUI 955 (FIG. 1).

The server memory stores a page document 151. The page document 151 includes information to generate the form 955. For example, the page document 151 can be a page, such as a JSP, BSP, or ASP page. The page document 151 includes page components 151-0, 151-1, 151-2, 151-3 that correspond to the form components 955-0, 955-1, 955-2, 955-3 (FIG. 1), respectively.

After translating the page document 151 into a browser document 150, typically done by the server, the browser document 150 is sent to the client. The browser document 150 can be a markup language document, for example, an HTML, XML, XHTML or WML document, which can be processed and rendered by a conventional browser. The browser document 150 includes browser components 150-0, 150-1, 150-2, 150-3 that correspond to the page components 151-0, 151-1, 151-2, 151-3, respectively.

The client stores the browser document 150 in the client memory, and renders it at time T1 as form 955 on an output device. The browser document 150 can have dynamic data and static data. Dynamic data can be changed through user interaction. Examples of dynamic data include input fields, output fields, status indicators, and user defined layout elements. Static data are defined in an application and, in general, are not changed through user interaction. Examples of static data include application defined layout elements, headers, background colors, and background patterns. Examples for using dynamic and static data are given in FIGS. 3A-3C in one implementation of the present invention.

In the example implementation, as shown in FIG. 1 and FIG. 2, the user enters the name of the contact person (SMITH) into the contact component 955-1. Accordingly, the client fills (step 210) the corresponding browser component 150-1 with the name of the contact person (illustrated by dark fill color in FIG. 2). At time T2, the client submits (step 220) a request 989 for the contact person's phone number to the server. In one implementation, the user presses submit component 955-3 and the client stores a corresponding status for the browser component 150-3 (illustrated by a diagonal grid pattern in FIG. 2). Alternatively, the request 989 can be submitted automatically by an application or a computer.

The server receives the request 989. In one implementation, the server accesses an application, e.g., an address database, retrieves the requested phone number from the application, and updates the corresponding page component 151-2 in page document 151 with the retrieved phone number (illustrated by dark fill color in FIG. 2). The phone number "98765-4321" is an application delta, which generally refers to any information the server retrieves in response to a request. Other application deltas can be generated for other page components substantially simultaneously. The server represents the application delta, i.e., the retrieved phone number, as a browser component. As received by the server, the request 989 changes the content of page document 151 that is used for processing.

The server allocates (step 410) component buffers 921-0, 921-1, 921-2, 921-3 (illustrated by dashed frames in FIG. 2) to page components 151-0 151-1, 151-2, 151-3, respectively. Into each component buffer 921-0, 921-1, 921-2, 921-3, the server writes (step 420) a corresponding browser component 150-0, 150-1, 150-2, 150-3. In FIG. 2, double arrows are drawn between component buffers and the corresponding page components to illustrate the allocation of component buffers to page components and the writing of browser components into component buffers.

The server writes (step 420) each browser component, i.e., 150-0, 150-1, 150-2, and 150-3, to its corresponding component buffer, i.e., 921-0, 921-1, 921-2, and 921-3. When the browser component of a component buffer changes, server detects change and identifies the changed component buffer (step 430). The server detects the change by comparing current browser components to previous ones. In the example, a browser delta 150-2d that represents the change is stored in component buffer 921-2. Depending on other requested data changes in request 989, the other component buffers can store other browser deltas. For convenience, however, in the example, only the component buffer 921-2 includes a browser delta. The allocation (410), writing (420), and identifying (430) steps are explained in more detail with reference to FIGS. 3A-3B.

The server sends (step 440) change information, which in the implementation being described is the browser delta 150-2d, to the client. After being received (step 510) by the client, the browser delta 150-2d is stored in the client memory. Using the browser delta 150-2d, the client updates (step 520) the corresponding browser component 150-2 (illustrated by dark fill color in FIG. 2) in the browser document 150. An implementation of the update is described with reference to FIG. 4. After updating the browser document 150, at time T3, the contact person's phone number (e.g. 98765-4321) is displayed for the user in phone component 955-2 corresponding to the browser component 150-2.

Figure 3A:
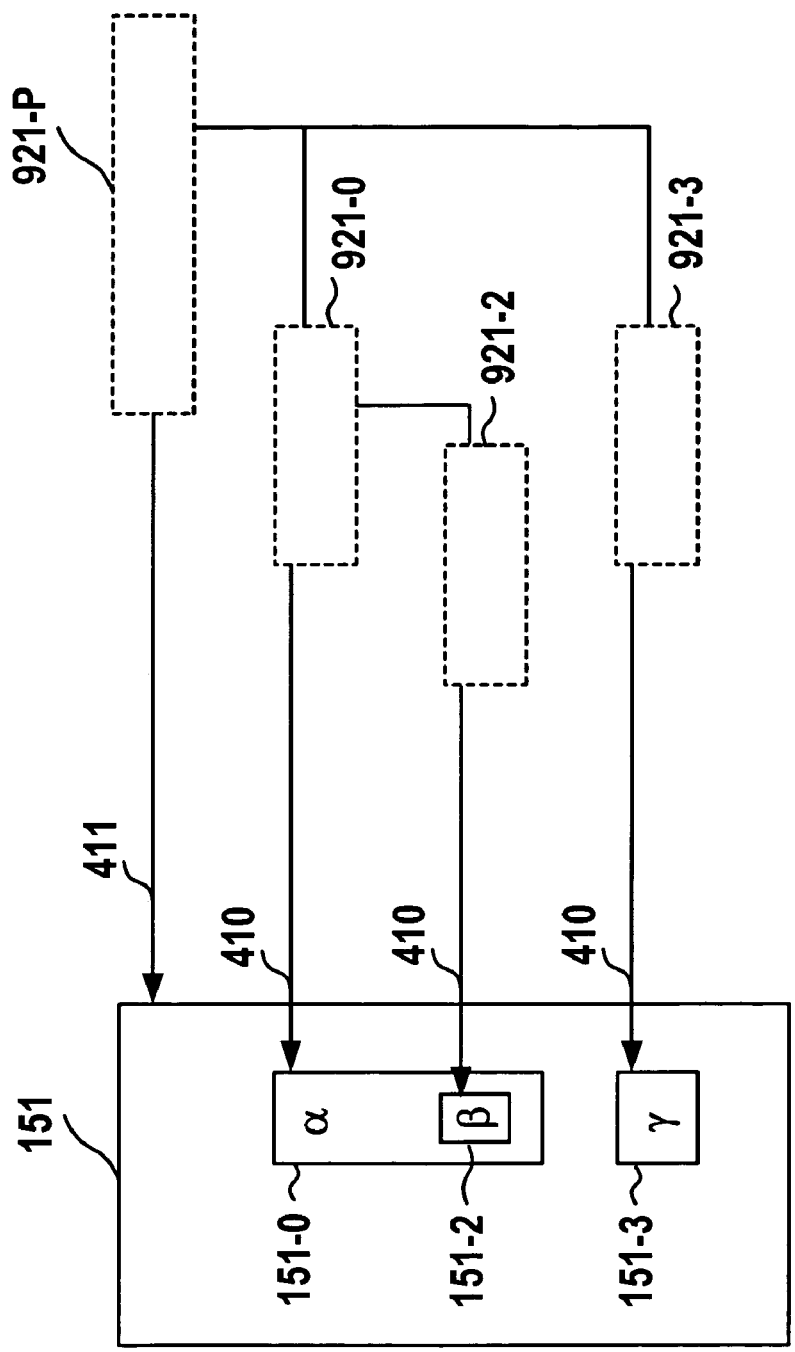
FIGS. 3A-3D are schematic diagrams illustrating generation of a browser delta on a server.

FIGS. 3A-3D illustrate details of generating browser deltas on the server. As shown in FIG. 3A, stored in the server memory, the page document 151 includes page components 151-0, 151-2, and 151-3, having identifiers (ID) $\alpha$, $\beta$, and $\gamma$, respectively. For convenience, in FIG. 3A, page component 151-1 is not shown. When the server processes page document 151, component buffers 921-0, 921-1, 921-2 are allocated (step 410) to corresponding page components 151-0, 151-2, 151-3, respectively. A component buffer is a memory buffer stored in the server memory. A component buffer can be allocated by, for example, a JSP-writer or a BSP-writer, if the page document 151 is a JSP page or a BSP page, respectively.

In one implementation, component buffers are organized in a memory stack, and a page buffer 921-P is allocated (step 411) to the page document 151. The page buffer 921-P is a root node in a buffer hierarchy where the component buffers are illustrated as child nodes. The buffer hierarchy specifies that the component buffer 921-3 is processed after both the component buffer 921-0 and its child node component buffer 921-2 have been processed.

Figure 3B:
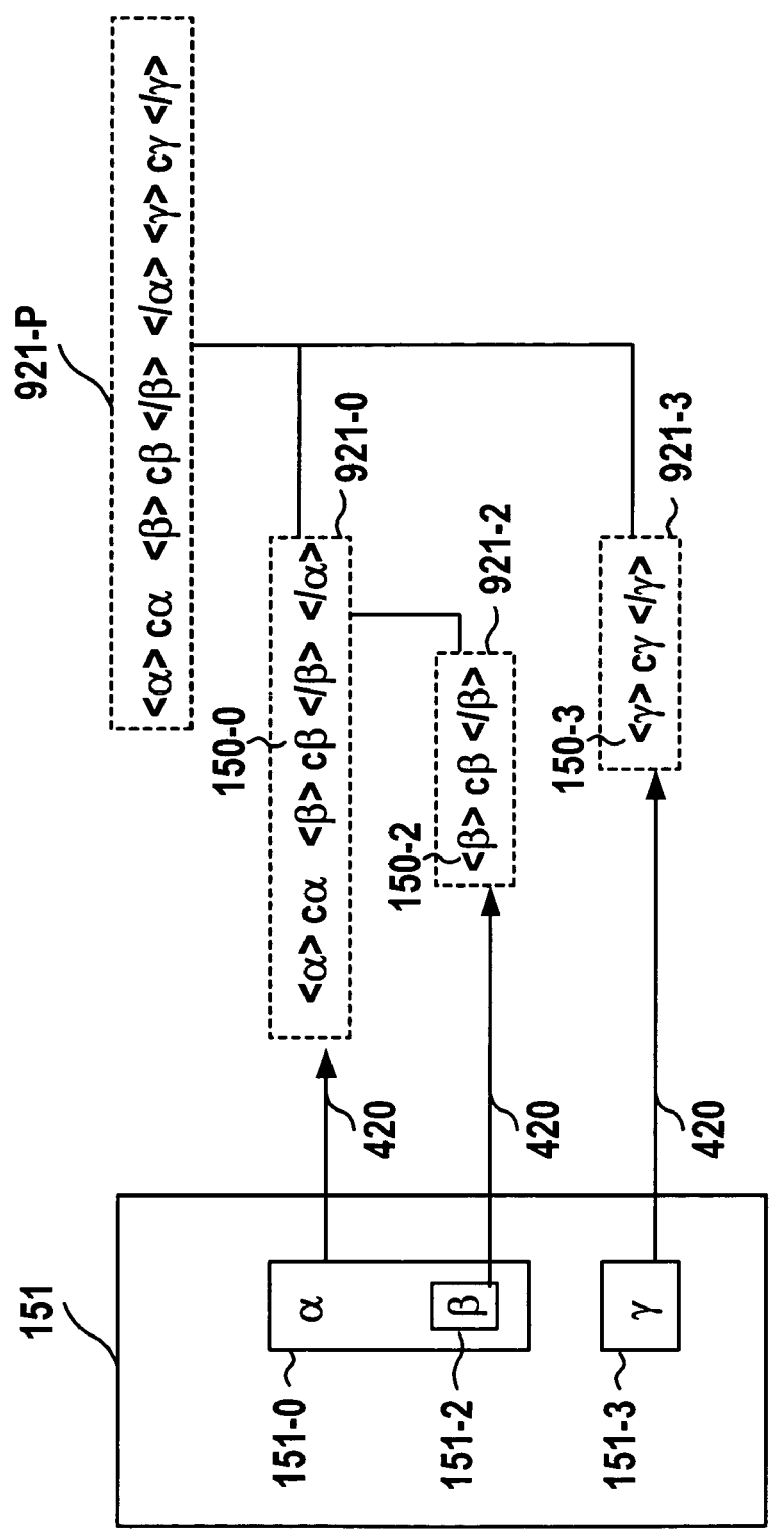

As shown in FIG. 3B, the server writes (step 420) browser components 150-0, 150-2, 150-3 into the corresponding component buffers 921-0, 921-2, 921-3. A browser component is generated from a corresponding page component. For example, in a page, page components are represented by tags, such as XML tags, e.g., $<t\alpha></t\alpha>$. The server translates the content of the tags into browser-compliant syntax including a content portion, e.g., $c\alpha$, $c\beta$, $c\gamma$ in JavaScript language or a markup language, such as HTML. The result of the translation is a browser component, e.g., $<\alpha>c\alpha</\alpha>$.

Optionally, the server can copy the content of a component buffer to its parent node in a buffer hierarchy. For example, as shown in FIG. 3B, a browser component 150-0 is generated in the component buffer 921-0. The browser component 150-0 starts with a start tag $<\alpha>$ and a content portion $c\alpha$. But before closing the browser component 150-0 with an end tag $</\alpha>$, the server processes a child node, namely the component buffer 921-2. During this processing, the component buffer 921-2 receives a browser component 150-2, e.g., $<\beta>c\beta</\beta>$. The browser component 150-2 is copied to the parent node of the component buffer 921-2, i.e., the component buffer 921-0. In the component buffer 921-0, the browser component 150-2 is inserted into the browser component 150-0. Then, the browser component 150-0 is closed with the end tag </α>.

The server can follow the buffer hierarchy, and copy the content of component buffer 921-0 to its parent node, i.e., page buffer 921-P. Accordingly, as shown in FIG. 3B, the browser component 150-0 is copied to page buffer 921-P. In page buffer 921-P, the browser component 150-0 can be followed by a next browser component, for example, a browser component 150-3, <γ>cγ</γ>, in component buffer 921-3. The page buffer 921-P and component buffers 921-0, 921-2, 921-3 reflect the structure of browser document 150.

Figure 3C:
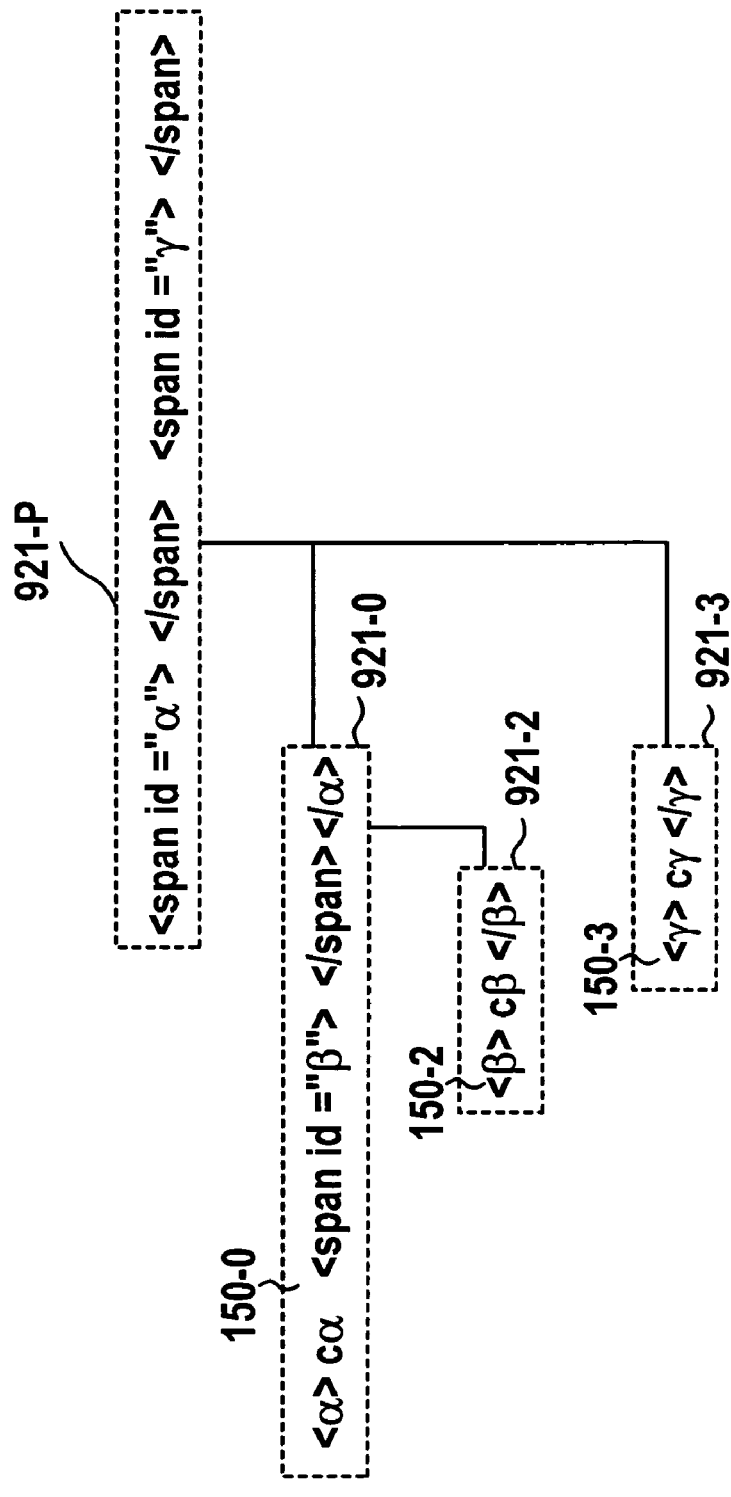

If a browser component of a child node, such as the one shown in FIG. 3C, is included in the child node's parent node, the server can replace a browser component in the parent node with a representation. Representation here refers to an identifier of the page component that corresponds to the browser component. FIG. 3C illustrates using representation for the component buffers 921-0, 921-2, 921-3 and page buffer 921-P. In the page buffer 921-P, the browser component 150-0, i.e., <α>cα<β>cβ</β></α>, is replaced with a representation <span id="α"></span>. The <span . . . ></span> syntax is an HTML example of a representation. As usual, the id=" . . . " parameter refers to the identifiers α, β, γ of the corresponding page components 151-0, 151-2, 151-3, respectively. Alternatively, any other standard representation can be used for referring to a page component's identification. In the example, the browser component 150-3, i.e., <γ>cγ</γ>, is replaced in page buffer 921-P with a representation <span id="γ"></span>. At the next lower level of the buffer hierarchy, the browser component 150-2, i.e., <β>cβ</β>, is replaced in the component buffer 921-0 with a representation <span id="β"></span>.

Using representations is advantageous in many cases, because a representation requires much less memory than the content portion of a corresponding browser component. Furthermore, after replacing browser components with representations as described above, page buffer 921-P and component buffers 921-0, 921-2, 921-3 still include all information about the structure and content of the browser document 150 (see, e.g., FIG. 2). Representations eliminate redundant information, and preserve necessary structural information.

Figure 3D:
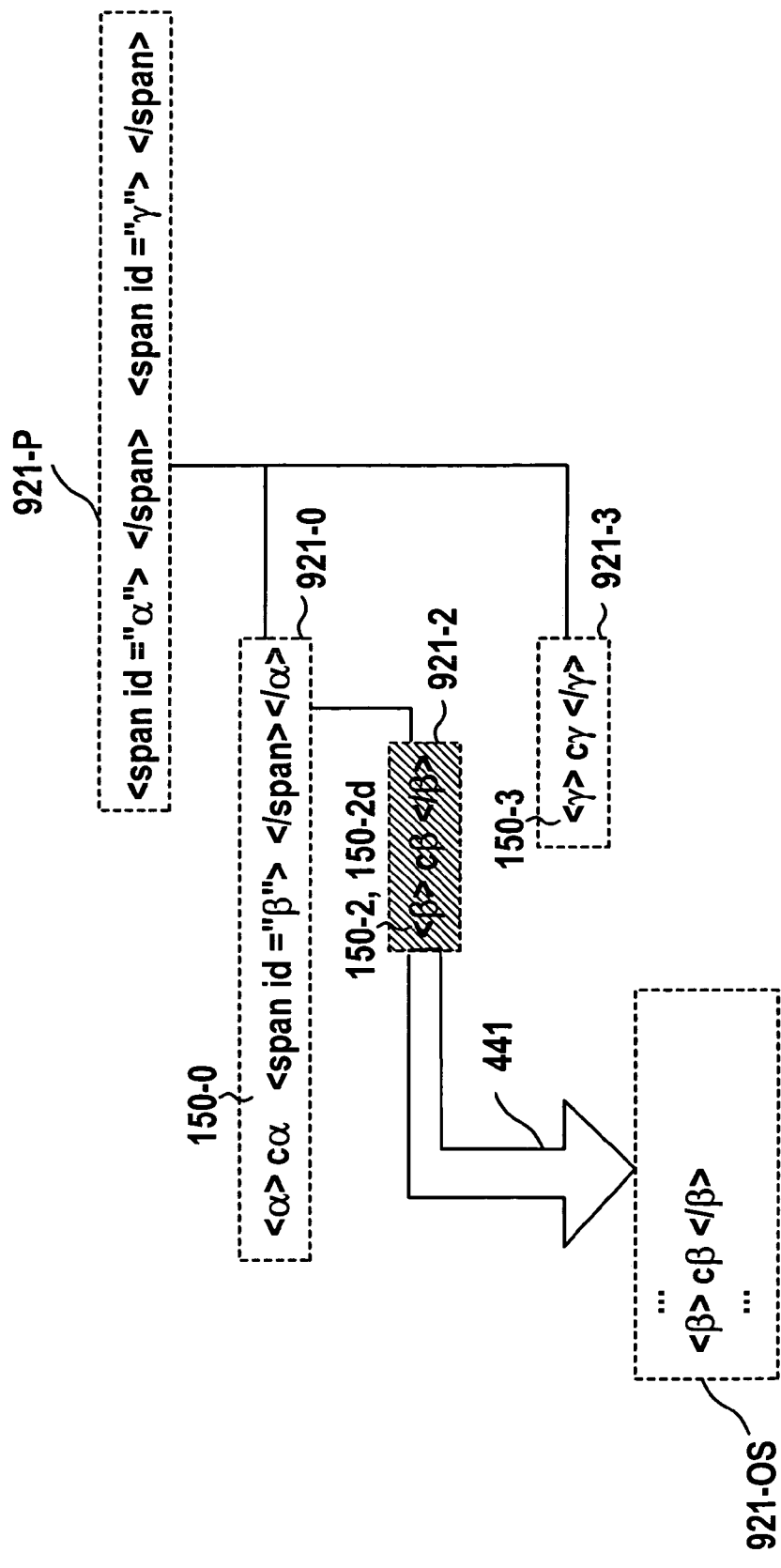

FIG. 3D illustrates generating (step 441) an output stream 921-OS. In a one implementation, the server generates an initial version of a browser document 150 (see, e.g., FIG. 2), and stores the initial version in the server memory. Then, the server sends the initial version to the client that displays it for a user at time T1 (FIG. 2). As shown in FIG. 3D, when sending the initial version to the client, the server can write the content of page buffer 921-P and the content of each component buffer in the buffer hierarchy to an output stream 921-OS. The output stream 921-OS is a data structure that can be sent to the client. The output stream 921-OS can include HTML code, JavaScript, or both. Alternatively, the output stream 921-OS can include any other code or scripting language that can be used by a conventional browser on the client. As received by the client for the first time, the output stream 921-OS contains the full browser document 150, including both structure and content. Next, the server can clear the output stream 921-OS.

Later, the server can generate a further version of the browser document 150. Generating the further version can be initiated, for example, by receiving a request 989 as described with reference to FIG. 2. Then, the server can compare the further version with the initial version to identify deltas, i.e., differences, between the two versions. Referring back to the example implementation shown in FIG. 1, when comparing the initial version with the further version, the deltas include the contact name "SMITH" and the phone number value "98765-4321". For convenience, in the following description, only the phone number value is considered.

After comparing the initial version with the further version, the server identifies (step 430; FIG. 2) the browser delta 150-2d in the component buffer 921-2. The server writes the browser delta 150-2d to the output stream 921-OS and sends it to the client. The server replaces the initial version with the further version, and the method described with reference to FIGS. 2-4D is repeated. Because the client knows the structure and static content portions of the browser document 150 from the initial version, the client can update the browser document 150 by using the browser delta 150-2d.

The following tables show examples of data structures for coding the example implementation shown in FIG. 1. For convenience, the examples focus on the phone component 955-2. In the coding sections, ellipses denote omitted coding blocks.

Table 1 illustrates a portion of a tag source of GUI 955, i.e., <htmlb:page>. Frame component 955-0, i.e., <htmlb:form>, includes the phone component 955-2 as <htmlb:inputField id="phone" . . . >.

TABLE 1

```
<%@page language="Java"%>
<%@taglib uri="http://..."prefix="htmlb"%>
    ...
    <htmlb:page>
        <htmlb:form>
        ...
            <htmlb:inputField id      ="phone"
                    value ="<%=phone%>"
                    .../> <BR>
        ...
        </htmlb:form>
    </htmlb:page>
...
```

To provide this tag source (XML) to the browser used by the client, the server generates an initial version of a browser document 150 as illustrated by such as the example shown in Table 2.

TABLE 2

```
<html>
<head>
...
</head>
<body>
<span id="htmlb_form_1 "></span>
...
</body>
</html>
<script language="JavaScript">
...
    dom_of_visible_item.doc("htmlb_form_1").outerHTML='<form id=\"htmlb_form_1\" name=\"htmlb_form_1\"...>
    <span id=\"...\"></span> <BR>
    <span id=\"phone\"></span> ... </form>';
...
    dom_of_visible_item.doc("phone").outerHTML='<input type=\"text\"... name=\"phone\"id=\"phone\"value=\"\">';
...
</script>
```

In Table 2, the portion from <html> to </html> illustrates an HTML example of content of page buffer 921-P for the initial version. Referring to FIG. 3D, id="htmlb_form_1" corresponds to id="α".

In Table 2, a JavaScript portion starts at <script language="JavaScript"> and ends at </script>. In the JavaScript portion, a JavaScript function dom_of_visible_item.doc("htmlb_form__1").outerHTML is a JavaScript implementation of the browser components 150-0. Similarly, dom_of_visible_item.doc("phone").outerHTML is a JavaScript implementation of browser components 150-2. In the initial version, the phone number value is empty ( ... id=\"phone\" value=\"\" ... ). When the server sends the initial version to the client, Table 2 is included in the output stream 921-OS (FIG. 3D).

TABLE 3

<script language="JavaScript">
...
dom_of_visible_item.doc("phone").outerHTML
='<input type=\"text\"...
name=\"phone\id=\"phone\"value=\"98765-4321\">';
...
</script>

Table 3 shows an example JavaScript implementation of browser delta 150-2d stored in component buffer 921-2 (see, e.g., FIG. 3D). The browser delta 150-2d is written to output stream 921-OS. In the example, the JavaScript function
  dom_of_visible_item.doc("phone").outerHTML
    includes the retrieved phone number value (value=\"98765-4321\") of browser component 150-2 (id=\"phone\"). Furthermore, the function
  dom_of_visible_item.doc("phone").outerHTML indicates to the client that, in the document object model corresponding to the browser document 150, the item ("phone") has to be replaced with the output of the function.

Figure 4:
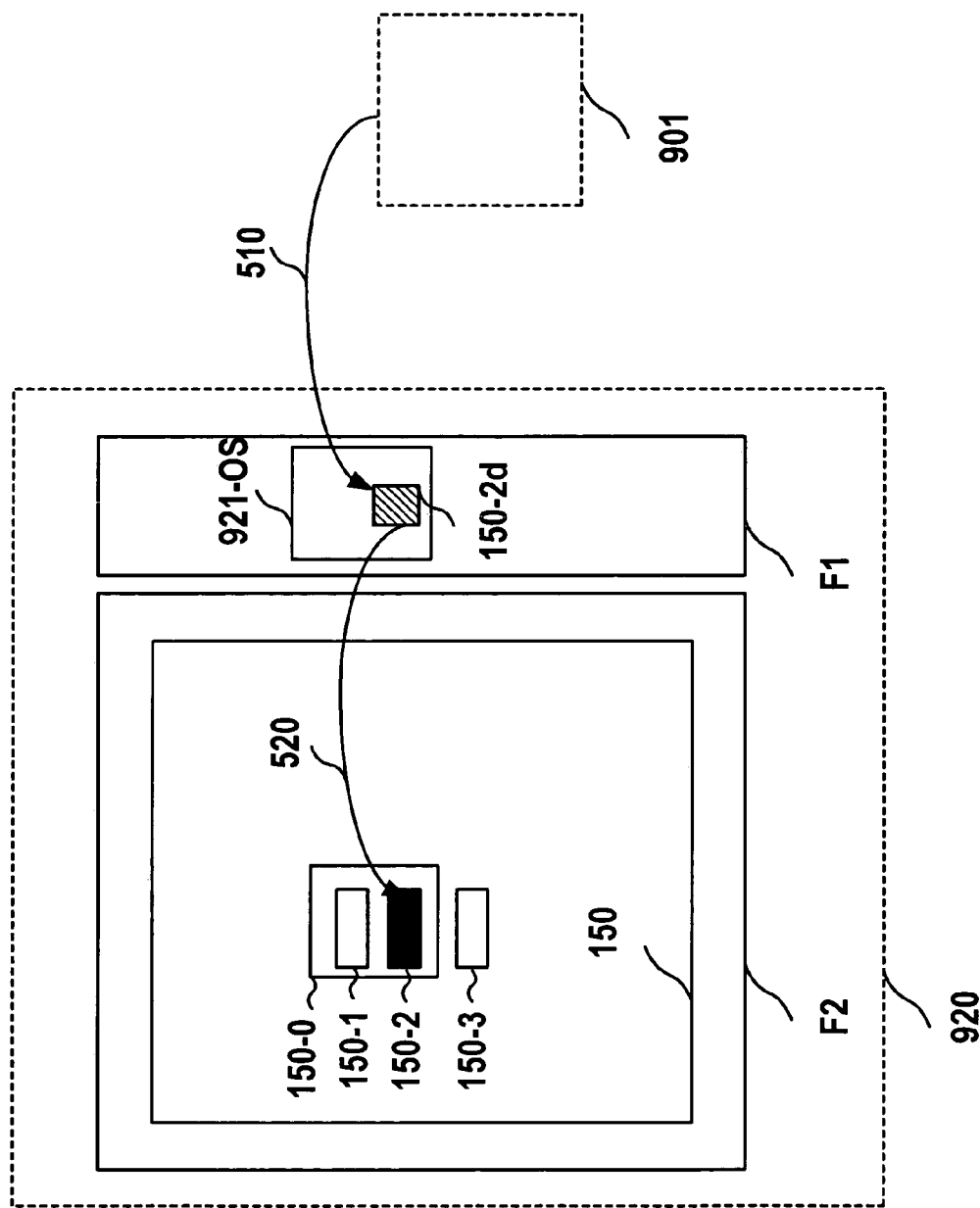
FIG. 4 is a schematic diagram illustrating update of a browser document with a browser delta on a client.

As shown in FIG. 4, a client can update browser document 150 with browser delta 150-2d. In one implementation, the memory 920 of the client stores a first frame F1 and a second frame F2. For example, the client sends (step 220; FIG. 2) a request 989 to a server. In the request 989, the client asks the server to send any server response, such as output stream 921-OS, to the first frame F1. When the client receives (step 510) the browser delta 150-2d from the server, e.g., as part of the output stream 921-OS, the memory 920 stores the browser delta 150-2d in the first frame F1. The client does not display the first frame F1 on an output device. For example, the width of the first frame F1 can be limited to a single pixel.

The client then updates (step 520) the browser document 150 stored in the second frame F2. The second frame F2 is already displayed on an output device. To update the browser document 150, the client can use the browser document structure information of page buffer 921-P from the initial version. Using this information, the client can replace modified parts of browser component 150-2 with the corresponding browser delta 150-2d (illustrated by dark fill color in FIG. 4) in the document object model (DOM) of the browser document 150. Equivalent techniques can be used as well to inject the browser delta 150-2d into the browser document 150. With the above implementations, the client may update the browser document 150 without causing screen flicker of form 955 (FIG. 1) for the user.

Figure 5:
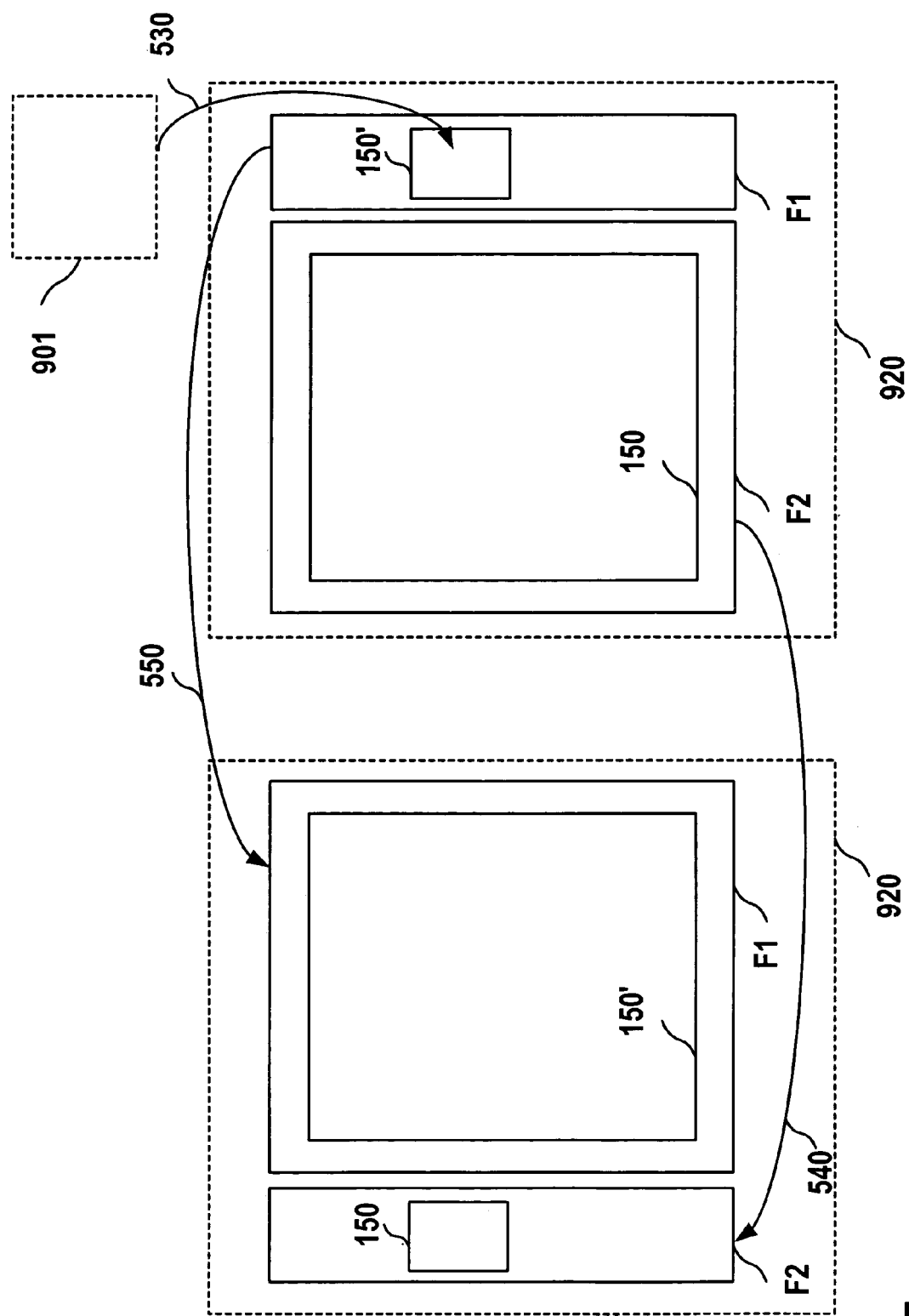
FIG. 5 is a schematic diagram showing a client receiving a new browser document in one implementation of the invention.

FIG. 5 illustrates swapping the roles of the first frame F1 and the second frame F2. Swapping frames can occur when the client receives a new browser document 150' from the server, instead of a browser delta. The new browser document 150' is received in the first frame F1 of the client. Then, the client recognizes the new browser document 150'. Next, substantially simultaneously, the client reduces (step 540) the size of the second frame F2 and expands (step 550) the size of first frame F1. After the reduction, the second frame F2 becomes invisible for the user. After the expansion, the first frame F1 can take the previous size of the second frame F2. Alternatively, the first frame F1 can take another size that is appropriate for the new browser document 150'. Alternatively, implementation, the expansion can follow the reduction. Swapping frames is typically faster than updating the second frame F2 with the new browser document 150' received in first frame F1. Swapping frames can result in less screen flicker and waiting time for the user. After the swap, the second frame F2 takes the role of receiver frame for browser deltas.

FIGS. 6A-6B show two computer-implemented methods 400, 500 for delta handling. The server can execute a server computer program that implements the server method 400. The client can execute a client computer program that implements the client method 500. These computer programs can be stored on any computer readable medium or carried by a signal on a network. In FIGS. 6A and 6B, mandatory method steps are illustrated by solid lines and frames, while optional method steps are illustrated by dashed lines and frames.

FIG. 6A shows a server method 400 for delta handling of a page document 151 stored in a server memory. The page document 151 includes a plurality of page components 151-0, 151-1, 151-2, and 151-3. The server method 400 includes an allocating step (410) and a writing step (420). In the allocating step, a component buffer, e.g., 921-0, 921-1, 921-2, or 921-3, is allocated to each page component 151-0 151-1, 151-2, 151-3. In the writing step, a corresponding browser component, e.g., 150-0, 150-1, 150-2, or 150-3, is written into each component buffer 921-0, 921-1, 921-2, and 921-3.

Optionally, the server method 400 is queried if it is executed for the first time for the page document 151 (decision 425). If not (NO branch of decision 425), further steps include an identifying step (430) and a sending step (440). In the identifying step, the server identifies at least one browser delta 150-2d in at least one identified component buffer 921-2. In the sending step, the at least one browser delta 150-2d is sent from the server to the client. The browser delta 150-2d can be in a browser compliant language selected from the group of HTML, XML, XHTML, WML, JavaScript and Visual Basic Script.

If the server method 400 is executed for the first time (YES branch of decision 425) for the page document 151, further steps include a building step (421), a replacing step (422), and a sending step (423). The server allocates page buffer 921-P to page document 151.

In the building step (421), the server builds a buffer hierarchy. The page buffer 921-P is the root node of the buffer hierarchy and is a parent node of at least one component buffer, e.g., 921-0 or 921-3. Each component buffer, e.g., 921-0, can be a parent node of further component buffers, e.g., 921-1 or 921-2.

In the replacing step (422), the server replaces the browser component, e.g., 150-0, 150-2, or 150-3, of a child node, e.g., 921-0, 921-2, 921-3, respectively, in a corresponding parent node, e.g., 921-P or 921-0, of the buffer hierarchy with a representation, e.g., <span ... ></span>, of the browser component 150-0, 150-2, 150-3.

In the sending step (423), the server 901 sends the page buffer 921-P and each component buffer 921-0, 921-1, 921-2, 921-3 of the buffer hierarchy to the client 900.

Optionally, it is possible to store component buffers in another memory of a computer system.

FIG. 6B shows a client method 500 for delta handling a browser document 150 stored on a client. The browser document 150 corresponds to the page document 151 stored on the server. The page document 151 includes a plurality of browser components, e.g., 150-0, 150-1, 150-2, and 150-3, wherein each browser component, i.e. 150-0, 150-1, 150-2, or 150-3, refers to a corresponding page component, 151-0, 151-1, 151-2, or 151-3, of the page document 151. The client method 500 includes a receiving step (510) and an updating step (520).

In the receiving step (510), the client receives a browser delta 150-2*d* from the server. The browser delta 150-2*d* refers to a specific browser component 150-2. The server identifies the browser delta 150-2*d* through a component buffer 921-2 allocated to the corresponding page component 151-2.

In the updating step (520), the client updates the browser document 150 with the browser delta 151-2*d*. To update the browser document 150, the client can inject the browser delta 151-2*d* into a document object model of the browser document 150. The document object model is stored in the client memory.

In an implementation using multiple frames as described earlier, the client receives the browser delta 151-2*d* in a first frame F1 of the client memory. The browser document 150 is updated (step 520) with the browser delta 151-2*d* in a second frame F2 of the client memory. The first frame F1 can be invisible.

In an alternative implementation, the client method 500 includes the following optional steps: receiving (step 530) a new browser document 150' in the first frame F1; reducing (step 540) the size of the second frame F2; and expanding (step 550) the size of the first frame F1. After the reduction, the second frame F2 can be invisible.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication.

The invention has been described in terms of particular embodiments. Other embodiments are within the scope of the following claims. For example, steps of the invention can be performed in a different order and still achieve desirable results.

What is claimed is:

1. A server method for processing a server-side page document, the page document comprising a plurality of page components, the method comprising:

generating a browser document from the page document, wherein generating the browser document from the page document includes:

generating from each page component of the page document a corresponding browser component, each browser component being in a browser compliant syntax; and building a document structure of the browser document from the page document, wherein the browser document corresponds to the page document, the document structure comprises a page buffer content and the generated browser components, the page buffer content is in a browser compliant syntax, the page buffer content corresponds to content of the page document, and the page buffer content and the browser components have relationships that reflect the structure of the browser document;

allocating a distinct component buffer to each page component of the plurality of page components of the page document and allocating a page buffer to the page document;

writing a corresponding browser component into each distinct allocated component buffer, each browser component corresponding to the page component to which the respective component buffer was allocated, each browser component being a component of a browser document corresponding to the page document, the browser document being the page in a form suitable for processing and display by a client;

building a buffer hierarchy of the allocated component buffers, the buffer hierarchy having a root node, wherein the page buffer is the root node of the buffer hierarchy and is a parent node of at least one component buffer, wherein each component buffer can be a parent node of further component buffers, the buffer hierarchy comprising a first parent node component buffer that is a parent of a first child node component buffer;

using a representation of the browser component in the first child node component buffer in representing the browser component in the first parent node component buffer; and sending the page buffer and each component buffer of the buffer hierarchy to a client.

2. The server method of claim 1 further comprising:

detecting a change in at least one identified component buffer; and transmitting information indicating the change to the client without transmitting the entire browser document to the client.

3. The server of method of claim 2, wherein:

detecting a change comprises identifying at least one browser delta in the at least one identified component buffer; and transmitting information indicating the change comprises sending the at least one browser delta to the client.

4. The sewer method of claim 3, wherein the at least one browser delta is represented in a browser-compliant language selected from the group of HTML, XML, XHTML, WML, JavaScript and Visual Basic Script.

5. The server method of claim 1, wherein the page document is a JSP, BSP, ADP, or ASP page.

6. The server method of claim 1, wherein each page component is represented by a tag within the page document.

7. The server method of claim 1, wherein each component buffer is stored in a memory stack.

8. A client method for receiving a page document, the page document comprising a plurality of page components, the method comprising:

receiving a page buffer and a buffer hierarchy of component buffers, wherein:

the page buffer and the buffer hierarchy represent a browser document that corresponds to a page document stored on a server and include a plurality of browser components, each browser component referring to a corresponding page component of the page document, where the browser document is generated from the page document, and wherein generating the browser document from the page document includes:

generating for each page component of the page document a corresponding browser component, each browser component being in a browser compliant syntax, and building a document structure of the browser document from the page document, wherein the browser document corresponds to the page document, the document structure comprises a page buffer content and the generated browser components, the page buffer content is in a browser compliant syntax, the page buffer content corresponds to content of the page document, and the page buffer content and the browser components have relationships that reflect the structure of the browser document;

the buffer hierarchy includes a distinct component buffer for each of the plurality of browser components, wherein each browser component is written into the corresponding component buffer, and the buffer hierarchy has a root node, wherein the page buffer is the root node of the buffer hierarchy and is a parent node of at least one component buffer, wherein each component buffer can be a parent node of further component buffers, the buffer hierarchy comprising a first parent node component buffer that is a parent of a first child node component buffer, the first parent node component buffer including a representation of the browser component in the first child node component buffer, the representation requiring less memory than is required by the browser component in the first child node component buffer;

displaying the browser document based on the page buffer and the buffer hierarchy;

receiving change information that refers to a specific browser component and specifies a change to the specific browser component; and updating the browser document in accordance with the change information.

9. The method of claim 8, wherein:

receiving change information comprises receiving a browser delta from the server, wherein the browser delta refers to a specific browser component and is identified by the server by a component buffer being allocated to the corresponding page component; and updating the browser document with the browser delta.

10. The client method of claim 9, wherein updating the browser document comprises:

injecting the browser delta into a document object model of the browser document.

11. The client method of claim 9, wherein the browser delta is received by a first frame and updating the browser document comprises updating the browser document with the browser delta in a second frame.

12. The client method of claim 11, wherein the first frame is invisible.

13. The client method of claim 11, further comprising:

receiving a new browser document in the first frame;

reducing the size of the second frame; and expanding the size of the first frame.

14. The client method of claim 13, wherein the second frame is invisible.

15. A server capable of processing a page document, the page document comprising a plurality of page components, the server comprising:

a memory storing a server-side page document that includes a plurality of page components, the memory providing a page buffer and a plurality of component buffers; and a processor executing instructions to:

generate a browser document from the page document, wherein instructions to generate the browser document from the page document include instructions to:

generate from each page component of the page document a corresponding browser component, each browser component being in a browser compliant syntax; and build a document structure of the browser document from the page document, wherein the browser document corresponds to the page document, the document structure comprises a page buffer content and the generated browser components, the page buffer content is in a browser compliant syntax, the page buffer content corresponds to content of the page document, and the page buffer content and the browser components have relationships that reflect the structure of the browser document;

allocate a distinct component buffer to each page component of the plurality of page components of the page document;

allocate the page buffer to the page document;

write a corresponding browser component into each distinct allocated component buffer, each browser component corresponding to the page component to which the respective component buffer was allocated, each browser component being a component of a browser document corresponding to the page document, the browser document being the page in a form suitable for processing and display by a client;

build a buffer hierarchy of the allocated component buffers, the buffer hierarchy having a root node, wherein the page buffer is the root node of the buffer hierarchy and is a parent node of at least one component buffer, wherein each component buffer can be a parent node of further component buffers, the buffer hierarchy comprising a first parent node component buffer that is a parent of a first child node component buffer;

use a representation of the browser component in the first child node component buffer in representing the browser component in the first parent node component buffer; and send the page buffer and each component buffer of the buffer hierarchy to a client.

16. The server of claim 15, wherein the processor executes further instructions to detect a change in at least one identified component buffer and to transmit information indicating the change to the client without transmitting the entire browser document to the client.

17. The server of claim 16, wherein the further instructions comprise instructions to identify at least one browser delta in at least one identified component buffer and to send the at least one browser delta to a client.

18. The server of claim 15, wherein each component buffer is stored in a stack of the memory.

19. A client capable of receiving a page document, the page document comprising a plurality of page components, the client comprising:
a memory; and
a processor, the processor executing instructions to:
receive a page buffer and a buffer hierarchy of component buffers and store the page buffer and the buffer hierarchy in the memory, wherein:
the page buffer and the buffer hierarchy represent a browser document that corresponds to a page document stored on a server and include a plurality of browser components, each browser component referring to a corresponding page component of the page document, where the browser document is generated from the page document, and wherein generating the browser document from the page document includes instructions to:
generate from each page component of the page document a corresponding browser component, each browser component being in a browser compliant syntax, and
build a document structure of the browser document from the page document, wherein the browser document corresponds to the page document, the document structure comprises a page buffer content and the generated browser components, the page buffer content is in a browser compliant syntax, the page buffer content corresponds to content of the page document, and the page buffer content and the browser components have relationships that reflect the structure of the browser document;
the buffer hierarchy includes a distinct component buffer for each of the plurality of browser components, wherein each browser component is written into the corresponding component buffer, and the buffer hierarchy has a root node, wherein the page buffer is the root node of the buffer hierarchy and is a parent node of at least one component buffer, wherein each component buffer can be a parent node of further component buffers, the buffer hierarchy comprising a first parent node component buffer that is a parent of a first child node component buffer, the first parent node component buffer including a representation of the browser component in the first child node component buffer;
display the browser document based on the page buffer and the buffer hierarchy;
receive change information that refers to a specific browser component and specifies a change to the specific browser component; and
update the browser document in accordance with the change information.

20. The client of claim 19, wherein:
instructions to receive change information further comprises instructions to receive a browser delta from the server, wherein the browser delta refers to a specific browser component and is identified by the server by a distinct component buffer being allocated to the corresponding page component; and
the instructions to update the browser document further comprise instructions to update the browser document with the browser delta.

21. The client of claim 20, wherein for updating the processor executes instructions to inject the browser delta into a document object model of the browser document.

22. The client of claim 20, wherein the memory provides a first frame to receive the browser delta and the processor executes instructions to update the browser document with the browser delta in a second frame provided by the memory.

23. The client of claim 22, wherein the first frame receives a new browser document and the processor executes instructions to reduce the size of the second frame and to expand the size of the first frame.

24. A computer program product, tangibly embodied on a computer readable medium, for processing a page document on a server, the page document comprising a plurality of components, the computer program product comprising instructions operable to cause a server computer to:
generate a browser document from the page document, wherein instructions to generate the browser document from the page document include instructions to:
generate from each page component of the page document a corresponding browser component, each browser component being in a browser compliant syntax, and
build a document structure of the browser document from the page document, wherein the browser document corresponds to the page document, the document structure comprises a page buffer content and the generated browser components, the page buffer content is in a browser compliant syntax, the page buffer content corresponds to content of the page document, and the page buffer content and the browser components have relationships that reflect the structure of the browser document;
allocate a distinct component buffer to each page component of the plurality of page components of the page document and to allocate a page buffer to the page document;
write a corresponding browser component into each distinct allocated component buffer, each browser component corresponding to the page component to which the respective component buffer was allocated, each browser component being a component of a browser document corresponding to the page document, the browser document being the page in a form suitable for processing and display by a client;

build a buffer hierarchy of the allocated component buffers, the buffer hierarchy having a root node, wherein the page buffer is the root node of the buffer hierarchy and is a parent node of at least one component buffer, wherein each component buffer can be a parent node of further component buffers, the buffer hierarchy comprising a first parent node component buffer that is a parent of a first child node component buffer;

use a representation of the browser component in the first child node component buffer in representing the browser component in the first parent node component buffer; and send the page buffer and each component buffer of the buffer hierarchy to a client.

25. The computer program product of claim 24 further comprising instructions operable to cause the server computer to:

detect a change in at least one identified component buffer; and transmit information indicating the change to the client without transmitting the entire browser document to the client.

26. The computer program product of claim 25, wherein:

the instructions to detect a change comprise instructions to identify at least one browser delta in the at least one identified component buffer; and the instructions to transmit information comprise instructions to send the at least one browser delta to the client.

27. The computer program product of claim 26 wherein the at least one browser delta is in a browser compliant language selected from the group of HTML, XML, XHTML, WML, JavaScript and Visual Basic Script.

28. The computer program product of claim 24, wherein the page document is a JSP, BSP, ADP or ASP page.

29. The computer program product of claim 24, wherein each page component is represented by a tag within the page document.

30. The computer program product of claim 24, wherein each component buffer is stored in a memory stack.

31. A computer program product, tangibly embodied on a computer readable medium, for receiving a page document on a client, the page document comprising a plurality of components, the computer program product comprising instructions operable to cause the client to:

receive a page buffer and a buffer hierarchy of component buffers and store the page buffer and the buffer hierarchy in the memory, wherein:

the page buffer and the buffer hierarchy represent a browser document that corresponds to a page document stored on a server and include a plurality of browser components, each browser component referring to a corresponding page component of the page document, where the browser document is generated from the page document, and wherein generating the browser document from the page document includes instructions to:

generate from each page component of the page document a corresponding browser component, each browser component being in a browser compliant syntax, and build a document structure of the browser document from the page document, wherein the browser document corresponds to the page document, the document structure comprises a page buffer content and the generated browser components, the page buffer content is in a browser compliant syntax, the page buffer content corresponds to content of the page document, and the page buffer content and the browser components have relationships that reflect the structure of the browser document;

the buffer hierarchy includes a distinct component buffer for each of the plurality of browser components, wherein each browser component is written into the corresponding component buffer, and the buffer hierarchy has a root node, wherein the page buffer is the root node of the buffer hierarchy and is a parent node of at least one component buffer, wherein each component buffer can be a parent node of further component buffers, the buffer hierarchy comprising a first parent node component buffer that is a parent of a first child node component buffer, the first parent node component buffer including a representation of the browser component in the first child node component buffer;

display the browser document based on the page buffer and the buffer hierarchy;

receive change information that refers to a specific browser component and specifies a change to the specific browser component; and update the browser document in accordance with the change information.

32. The computer program product of claim 31, wherein:

the instructions operable to cause the client to receive change information further comprise instructions to receive a browser delta from the server, wherein the browser delta refers to a specific browser component and is identified by the server via a distinct component buffer being allocated to the corresponding page component; and the instructions operable to cause the client to update the browser document further comprise instructions to update the browser document with the browser delta.

33. The computer program product of claim 32, wherein the instructions operable to cause the client to update the browser document comprise instructions operable to cause the client to:

inject the browser delta into a document object model of the browser document.

34. The computer program product of claim 32, wherein the instructions operable to cause the client to receive the browser delta comprise instructions operable to cause the client to receive the browser delta in a first frame and the instructions operable to cause the client to update the browser document comprise instructions operable to cause the client to update the browser document with the browser delta in a second frame.

35. The computer program product of claim 34, wherein the first frame is invisible.

36. The computer program product of claim 34, further comprising instructions operable to cause the client to:

receive a new browser document in the first frame;

reduce the size of the second frame; and expand the size of the first frame.

37. The computer program product of claim 36, wherein the second frame is invisible.

* * * * *